United States Patent
Nagely

(10) Patent No.: US 9,578,851 B2
(45) Date of Patent: Feb. 28, 2017

(54) TRANSPORTABLE ANIMAL CARE STATION

(71) Applicant: Arnold G. Nagely, Maryville, KS (US)

(72) Inventor: Arnold G. Nagely, Maryville, KS (US)

( * ) Notice: Subject to any disclaimer, the term of this patent is extended or adjusted under 35 U.S.C. 154(b) by 279 days.

(21) Appl. No.: 14/310,696

(22) Filed: Jun. 20, 2014

(65) Prior Publication Data

US 2015/0366159 A1  Dec. 24, 2015

(51) Int. Cl.
*A01K 3/00* (2006.01)
*A01K 1/02* (2006.01)
*A01K 13/00* (2006.01)

(52) U.S. Cl.
CPC ............ *A01K 1/0272* (2013.01); *A01K 13/00* (2013.01)

(58) Field of Classification Search
CPC . B60P 1/48; B60P 1/483; B66C 1/101; A01K 1/0272; A01K 13/00; A01K 15/00; A01K 1/0035
USPC ....... 414/546, 547, 555; 119/512; 296/24.31
See application file for complete search history.

(56) References Cited

U.S. PATENT DOCUMENTS

| | | | | |
|---|---|---|---|---|
| 3,966,069 A | * | 6/1976 | Fathauer | B66F 9/186 294/81.2 |
| 4,155,518 A | * | 5/1979 | Small | B60P 3/035 242/388.7 |
| 4,666,177 A | * | 5/1987 | Vinchattle | B60D 1/363 280/477 |
| 4,811,965 A | * | 3/1989 | Eubanks | B60D 1/50 280/455.1 |
| 5,882,085 A | * | 3/1999 | Pekarek | B60P 1/483 296/183.2 |
| 7,731,217 B2 | * | 6/2010 | Stutts | B60D 1/36 280/477 |
| 8,443,759 B2 | | 5/2013 | Nagely | |
| 2010/0054899 A1 | * | 3/2010 | Hacker | B60P 1/6463 414/470 |

FOREIGN PATENT DOCUMENTS

| | | |
|---|---|---|
| CA | 2811179 | 3/2012 |
| CA | 2788937 | 3/2014 |

OTHER PUBLICATIONS

Protest Notification in Canadian Patent Application Serial No. 2,811,179 (notice dated Jun. 15, 2016).

* cited by examiner

Primary Examiner — Michael McCullough
Assistant Examiner — Mark Hageman
(74) Attorney, Agent, or Firm — Hovey Williams LLP

(57) ABSTRACT

A transportable animal care station includes an enclosure and a pair of opposite transport couplers. The enclosure includes a frame and defines a treatment space. The enclosure presents an opening that permits ingress and egress relative to the treatment space. The transport couplers are fixed relative to the frame, with each of the couplers being removably connectable to a corresponding one of the lifting components.

18 Claims, 15 Drawing Sheets

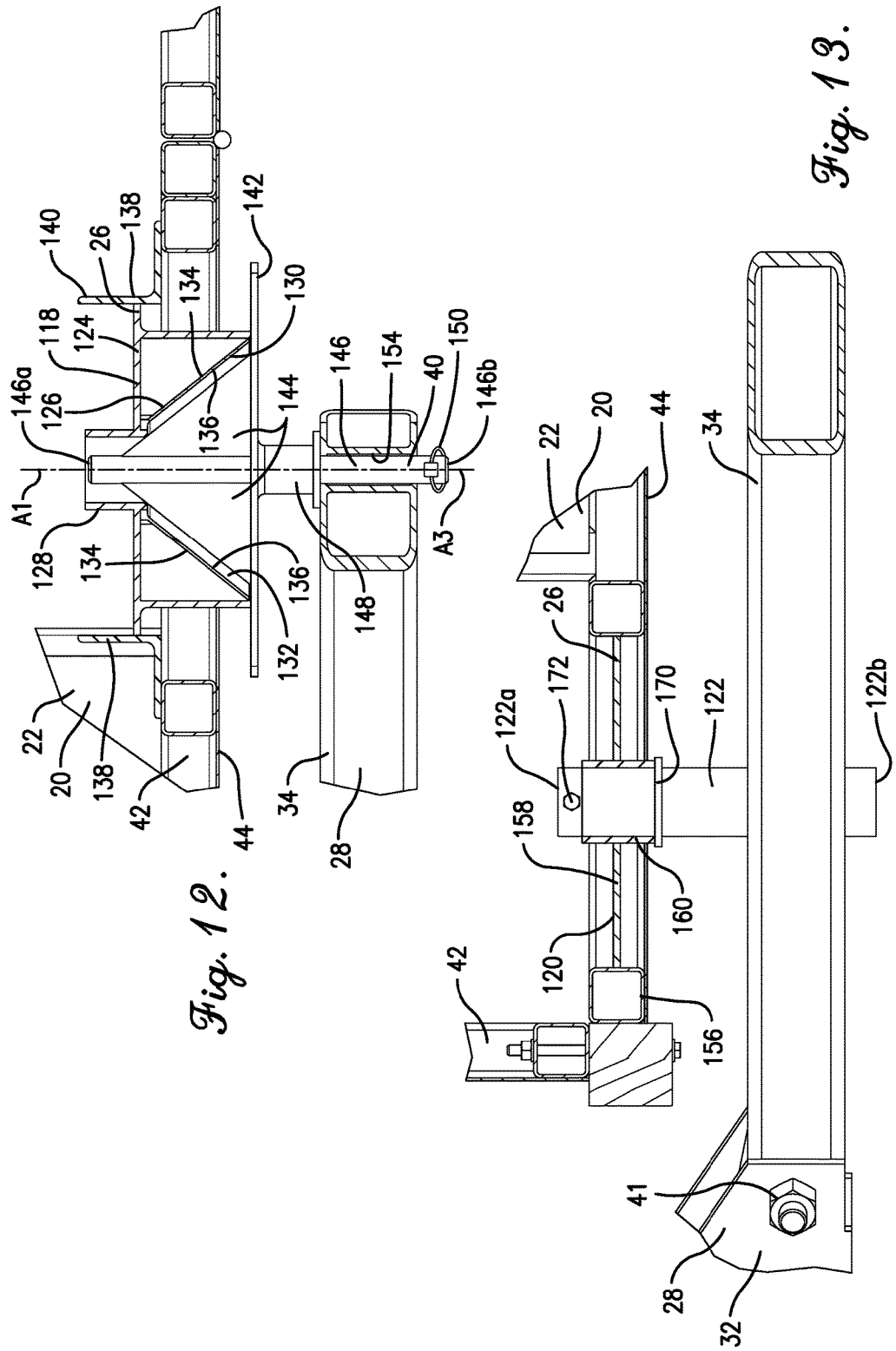

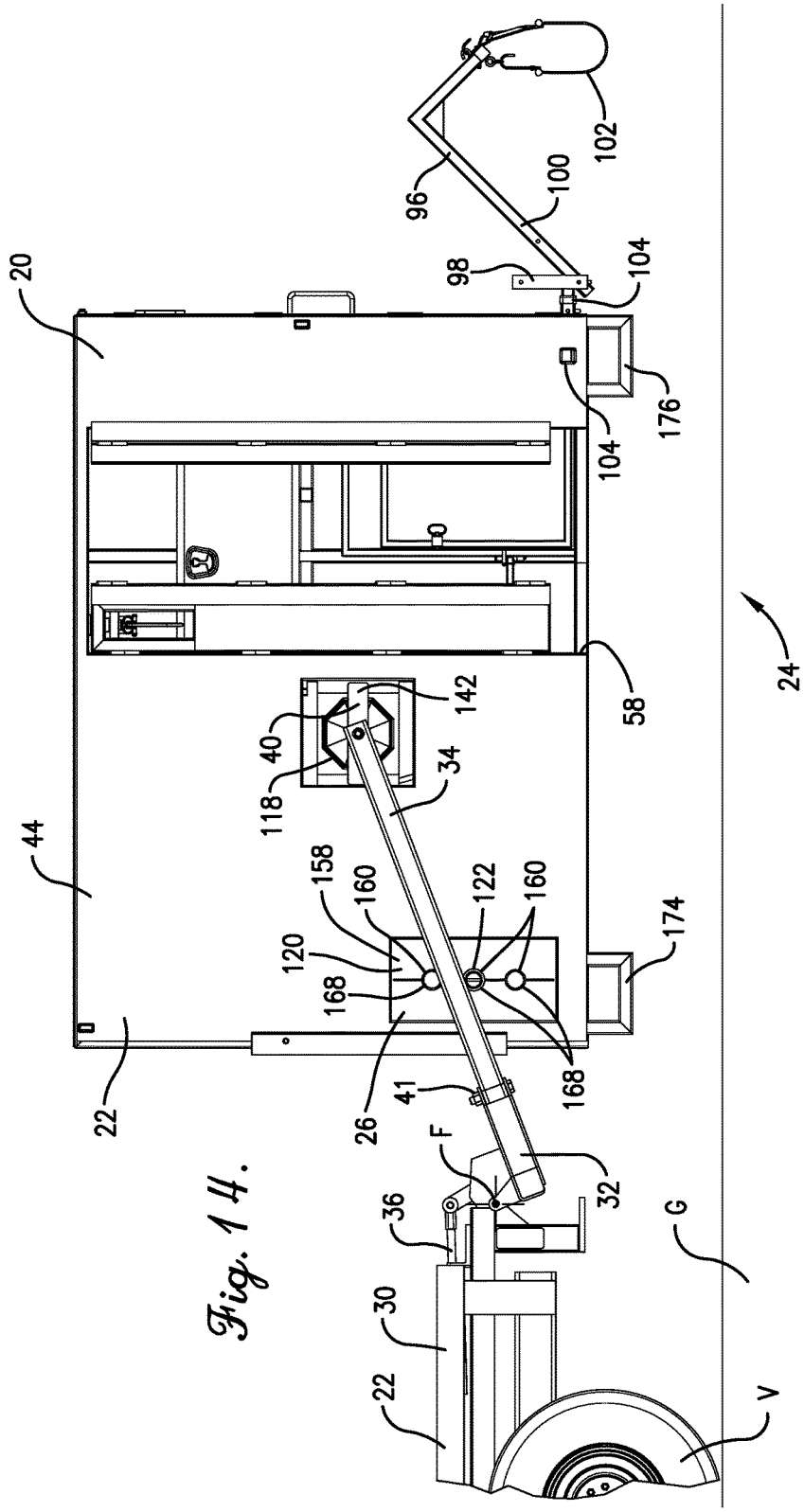

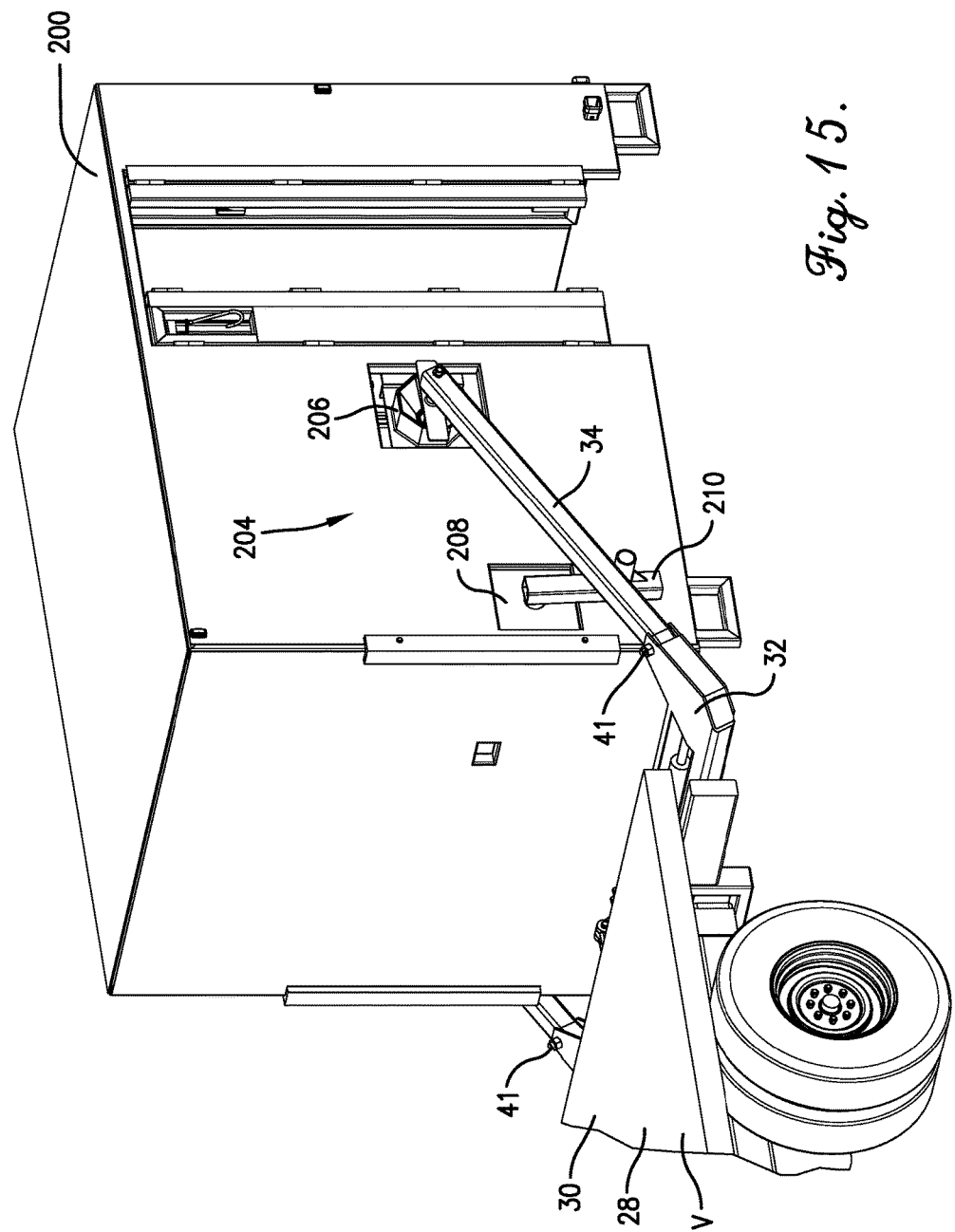

TRANSPORTABLE ANIMAL CARE STATION

BACKGROUND

1. Field

The present invention relates generally to a mobile enclosure with a doorway. More specifically, embodiments of the present invention concern a transportable animal care station that can be lifted and transported by a vehicle.

2. Discussion of Prior Art

People have long sought to observe and/or treat animals, whether tame or wild, in the animal's customary environment. This is particularly true of ranchers or farmers who raise livestock. Large varieties of livestock, such as cattle or horses, are ubiquitous on North American farms and require periodic care. However, such animals often present a bodily threat to the care provided, particularly if an animal acts defensively and/or aggressively. A newborn bovine calf typically requires treatment, observation, and/or transportation by the owner soon after birth. However, the bovine mother will instinctively protect the calf from any intruder, including a human, and can potentially injure a human in close proximity to the calf. Movable pens and trailers are used by care providers to catch and observe cattle in remote locations.

Prior art trailers, mobile pens, and other vehicles are deficient at supporting the in situ treatment of animals by a care provider and suffer from certain undesirable limitations. For instance, care providers often must catch and treat newborn calves without the assistance of another person. When in the presence of an aggressive and/or defensive cow, it is difficult for the care provider to catch and hold the calf while avoiding contact with the cow, even when a prior art vehicle or pen is available. Prior art trailers and mobile pens are also time consuming and difficult to deploy at a treatment location using a vehicle, particularly where the location has limited space for the vehicle to maneuver.

SUMMARY

The following brief summary is provided to indicate the nature of the subject matter disclosed herein. While certain aspects of the present invention are described below, the summary is not intended to limit the scope of the present invention.

Embodiments of the present invention provide a transportable animal care station that does not suffer from the problems and limitations of the prior art enclosures set forth above.

A first aspect of the present invention concerns a transportable animal care station operable to be lifted and transported by a vehicle having a pair of opposite lifting components. The transportable animal care station broadly includes an enclosure and a pair of opposite transport couplers. The enclosure includes a frame and defines a treatment space. The enclosure presents an opening that permits ingress and egress relative to the treatment space. The transport couplers are fixed relative to the frame, with each of the couplers being removably connectable to a corresponding one of the lifting components.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 12 is a cross section of the transportable animal care station and vehicle taken along line 12-12 in FIG. 9;

FIG. 13 is a cross section of the transportable animal care station and vehicle taken along line 13-13 in FIG. 9;

FIG. 14 is a left side elevation of the transportable animal care station and vehicle similar to FIG. 9, but showing the bars of the transport modules positioned at middle attachment locations presented by the mounting brackets, and showing a sling assembly mounted on a rear wall of the enclosure;

Figure 16:
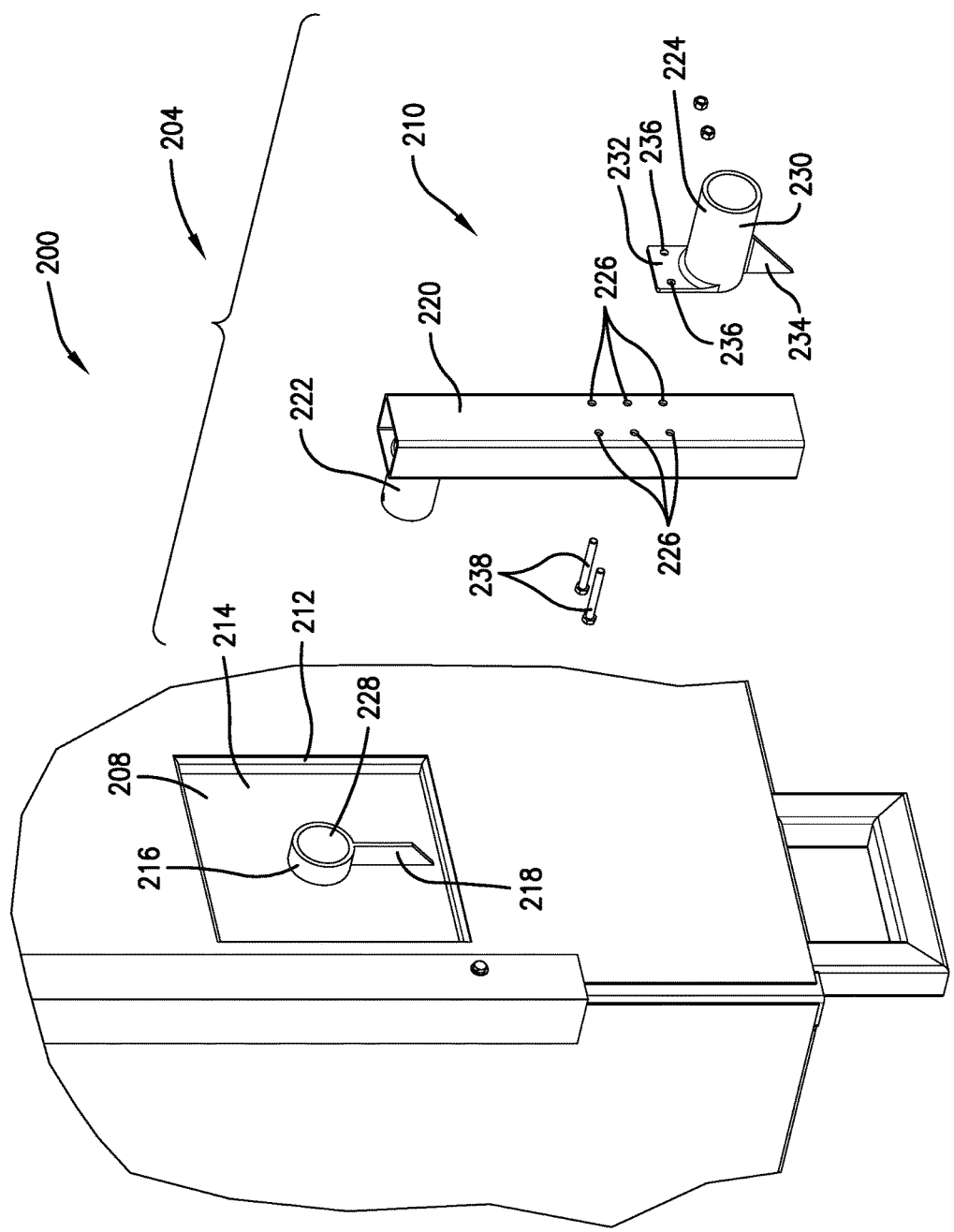

FIG. 15 is a left front perspective of a transportable animal care station constructed in accordance with a first preferred embodiment of the present invention, with the station being supported by a vehicle and including an enclosure, an adjustable door assembly, and opposite transport modules; and FIG. 16 is an enlarged fragmentary left front perspective of the transportable animal care station shown in FIG. 15, showing an adjustable stop exploded from one of the transport modules.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Turning initially to FIGS. 1-4, a transportable animal care station 20 provides a mobile enclosure for observation, transport, and/or medical treatment of an animal. The illustrated station 20 is preferably configured for in situ, neonatal care of bovine animals. The station 20 has been found to be particularly useful as an enclosed care station for newborn calves because the enclosure permits efficient ingress and egress by the care provider and, at the same time, protects the newborn calf and care provider from harm or intrusion by other members of a herd, including the calf's mother. However, the principles of the present invention are applicable where the station 20 is used for veterinary purposes in connection with other animals. Station 20 broadly includes, among other things, an enclosure 22, an adjustable door assembly 24, and opposite transport modules 26.

Turning to FIGS. 5-9, the station 20 is selectively transportable by a vehicle V. The vehicle V preferably includes a truck with a powered lift mechanism 28 in the form of a round bale pickup. The lift mechanism 28 includes a bed 30, a pivotal lift base 32, a pair of lift arms 34 swingably attached to the lift base 32, hydraulic cylinders 36,38, and prongs 40.

Figure 6:
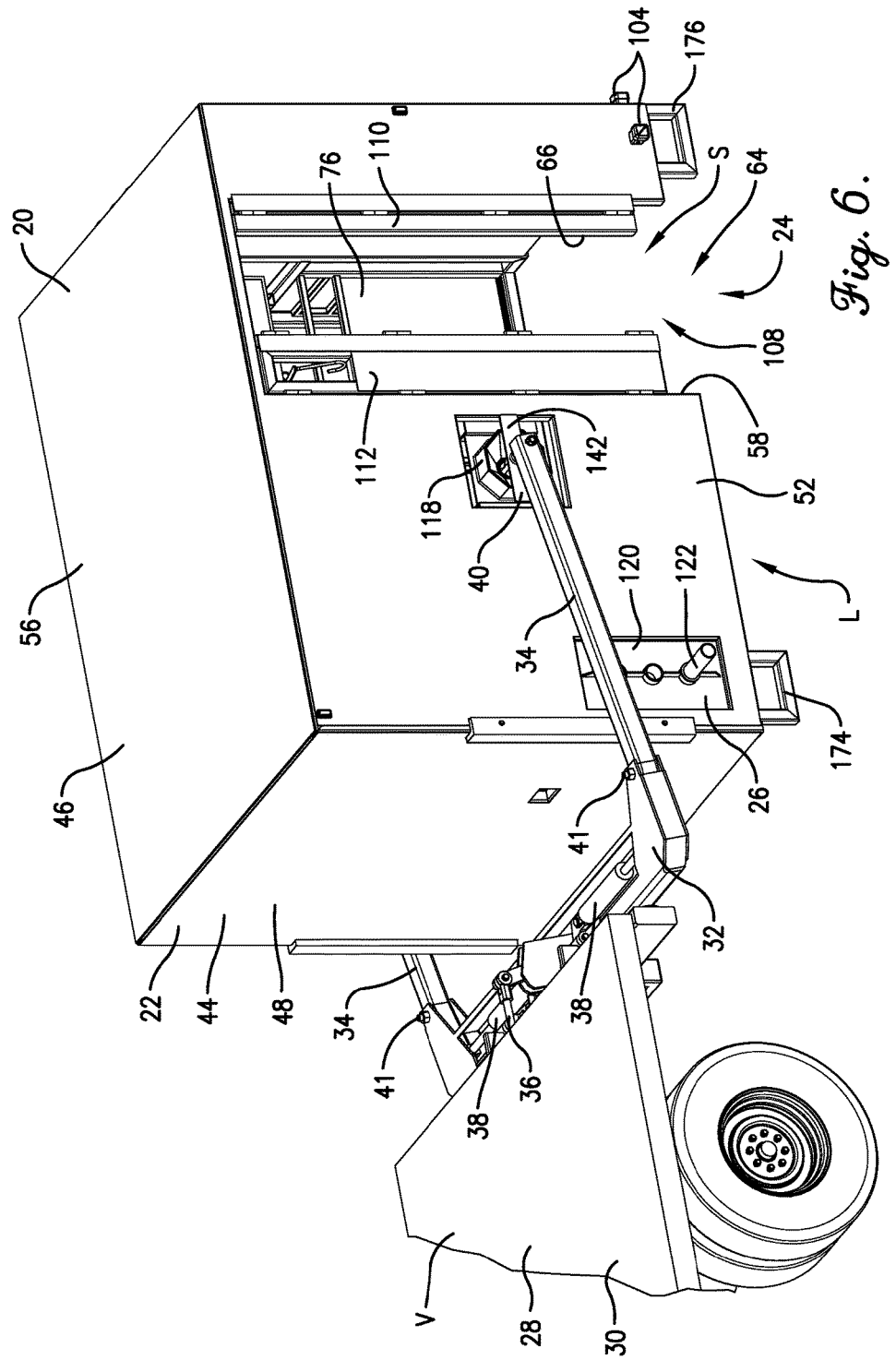
FIG. 6 is a fragmentary left front perspective of the transportable animal care station and vehicle shown in FIG. 5, showing prongs of the lift assembly engaged with transport couplers of the station so that the lift assembly grasps the station.
Figure 7:
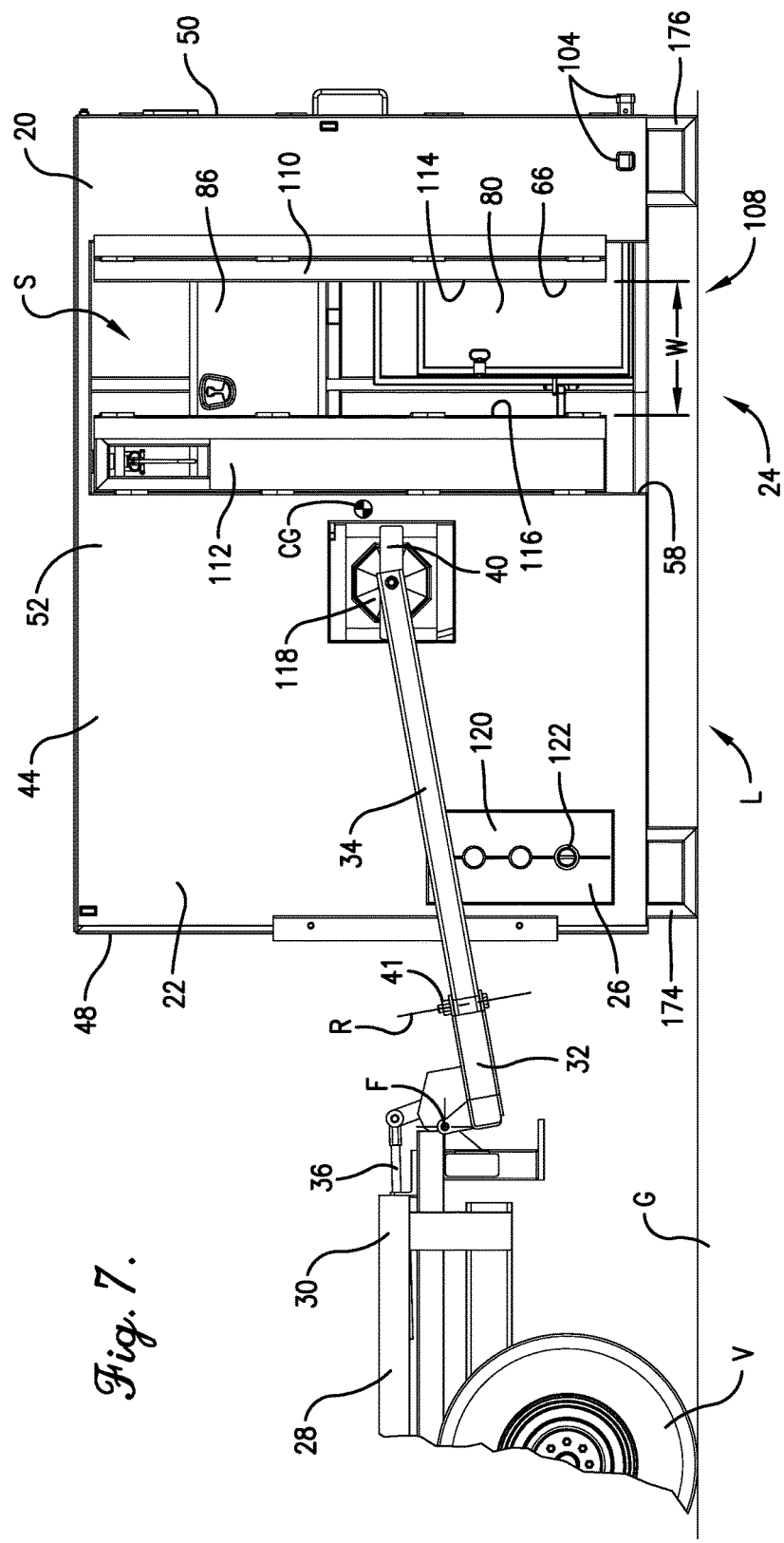
FIG. 7 is a left side elevation of the transportable animal care station and vehicle shown in FIGS. 5 and 6, showing the lift assembly grasping the station, with the station being in a rest position on the ground, and showing mounting brackets and bars of the transport modules, with the bars secured to the mounting brackets at lowermost attachment locations.

In the usual manner, the lift base 32 is pivotally attached to the bed 30 to pivot about a lateral lift axis F (see FIG. 7). The hydraulic cylinder 36 interconnects the bed 30 and the lift base 32 to control the position of the lift base 32 relative to the bed 30. As a result, the hydraulic cylinder 36 can drive the lift base 32 through a range of positions between a fully retracted lift position (not shown) where the lift arms 34 extend along the bed 30, and a fully extended lift position (not shown) where the lift arms 34 project rearwardly behind the bed 30. Certain intermediate lift arm positions between the retracted and extended positions are depicted in FIGS. 6-9.

Figure 8:
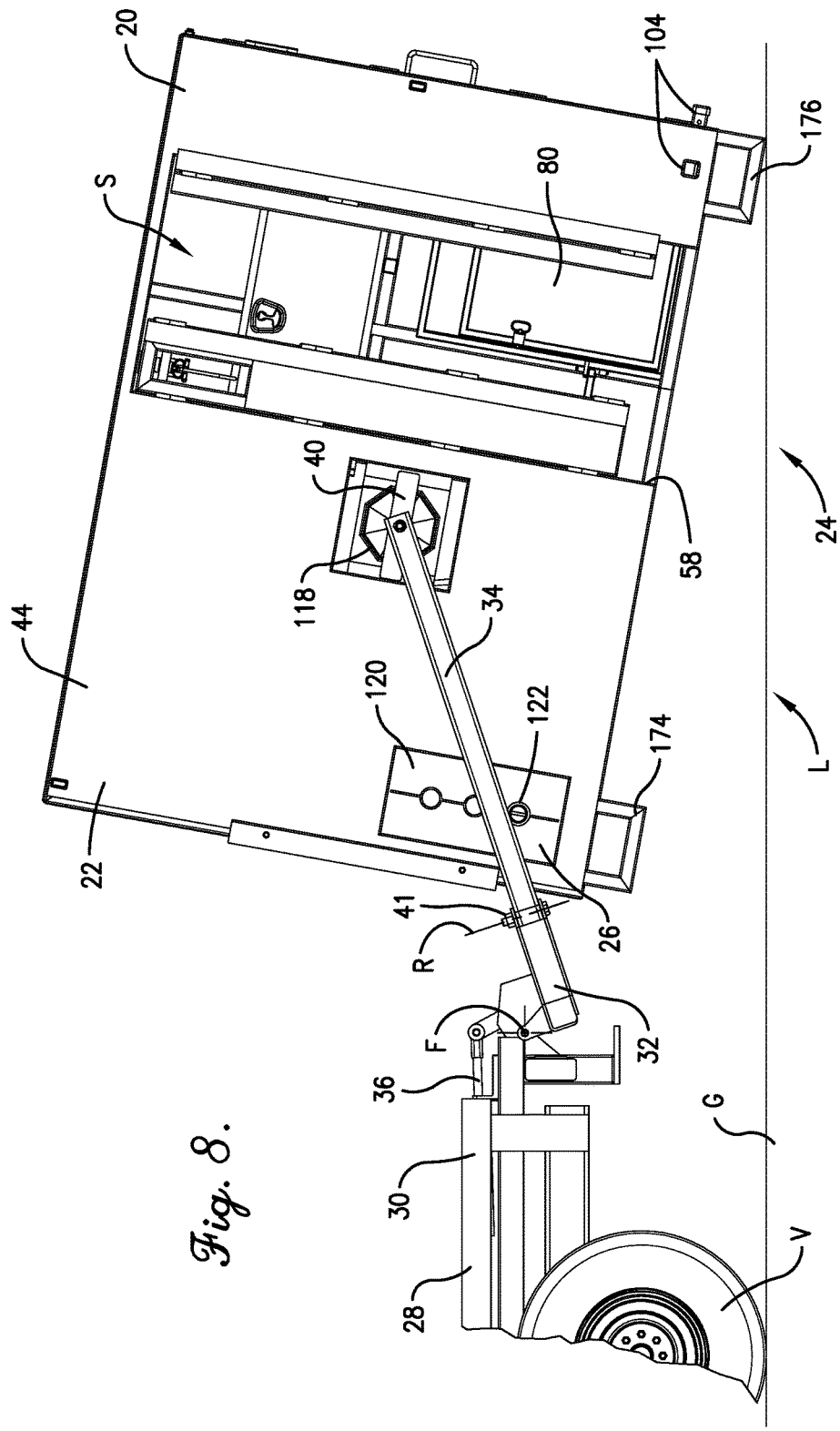
FIG. 8 is a left side elevation of the transportable animal care station and vehicle similar to FIG. 7, but showing the lift assembly pivoted upwardly to lift the station from the rest position to an intermediate position where forward feet of the station are spaced above the ground, with the bars of the transport modules engaging lift arms of the lift assembly.
Figure 9:
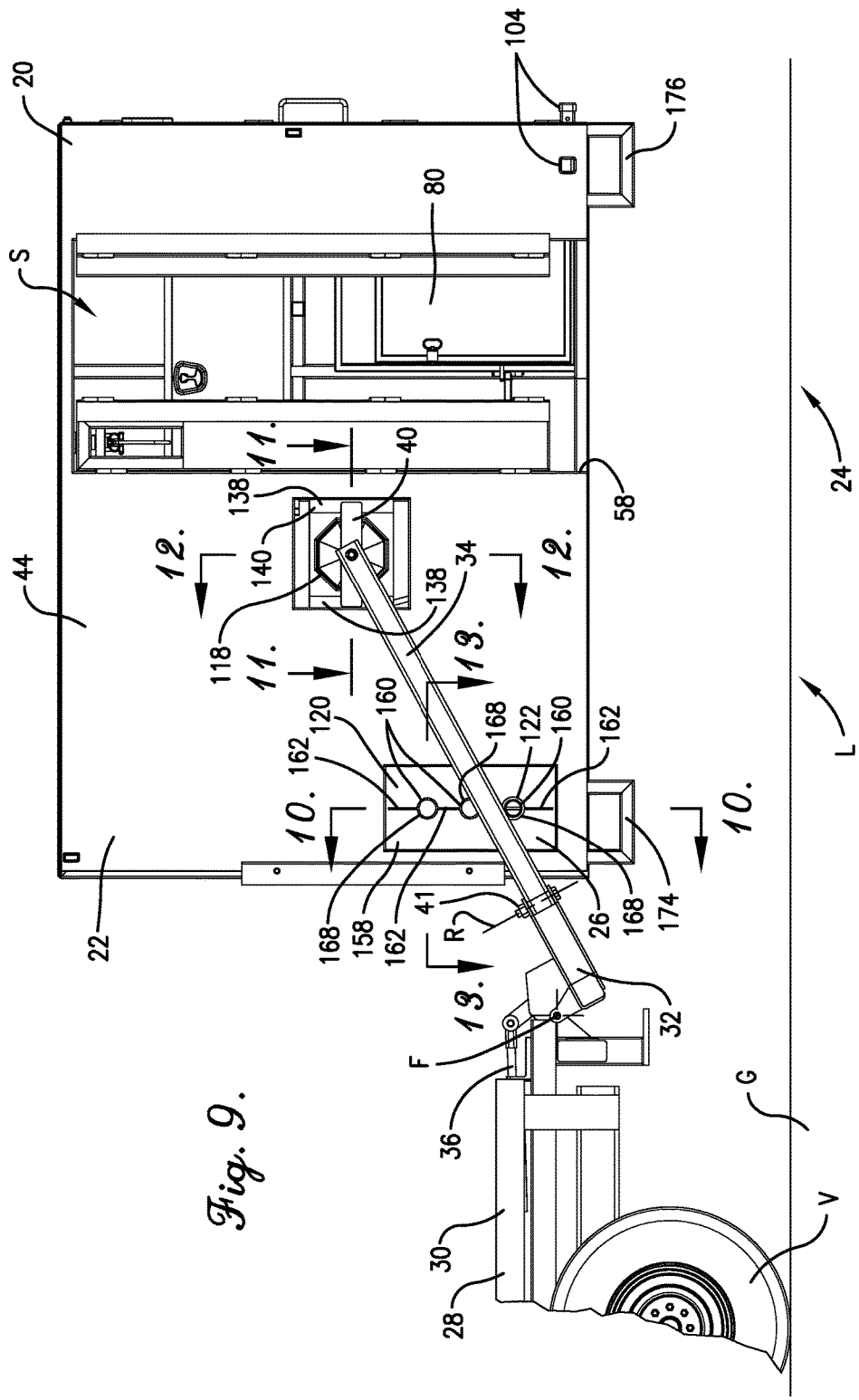
FIG. 9 is a left side elevation of the transportable animal care station and vehicle similar to FIG. 8, but showing the lift assembly pivoted upwardly to lift the station from the intermediate position to an elevated position where the entire station is spaced above the ground.

The lift arms 34 are pivotally attached to the lift base 32 at pivot joints 41 and are each pivotal about an arm pivot axis R transverse to the lateral lift axis F (see FIGS. 7-9). The hydraulic cylinders 38 interconnect a corresponding one of the lift arms 34 to the lift base 32 to control the position of the lift arm 34 relative to the lift base 32. Each hydraulic cylinder 38 can drive the respective lift arm 34 through a range of positions between a fully inboard arm position (not shown) and a fully outboard arm position (not shown). In one intermediate arm position between the inboard and outboard positions, the lift arms 34 are positionable so that the prongs 40 engage the enclosure (see FIGS. 6, 11, and 12). In another intermediate arm position, the lift arms 34 are shifted outboard so that the prongs 40 are adjacent but disengaged from the enclosure (see FIG. 5).

Turning to FIGS. 1-7, the enclosure 22 presents an enclosed treatment space S above the treatment location L. As will be discussed further, the enclosure 22 also includes various features to house equipment for animal treatment (e.g., veterinary procedures).

The illustrated enclosure 22 includes, among other things, a frame assembly 42, a covering 44 secured along the sides of frame assembly 42, and a translucent roof panel 46. The frame assembly 42, covering 44, and roof panel 46 cooperatively provide front and rear walls 48,50, left and right side walls 52,54, and a roof 56 that are integrally fixed to one another so that the frame assembly 42 is substantially rigid (see FIGS. 1-7). The walls 48,50,52,54 and roof 56 each preferably include a plurality of tubular members made of carbon steel and welded to one another, although the walls and roof could include other types of structural components and/or components made of other materials (e.g., to provide suitable structural rigidity).

Preferably, the roof panel 46 includes a translucent material so that the roof 56 allows ambient light to pass into the treatment space S. More preferably, the roof panel 46 is made of BULITEX® translucent roof panel material, which is manufactured by U.S. Liner Company, of Ambridge, Pa. Thus, the roof 56 covers the treatment space S to shield the user from weather elements while allowing light into the enclosure 22.

The illustrated enclosure 22 presents a left side opening 58, a rear access opening 60, and a rear compartment opening 62 that permit ingress and egress relative to the enclosure 22 (see FIGS. 1-6). The enclosure 22 further presents an open bottom 64 that extends along a bottom margin of the enclosure 22 (see FIGS. 3 and 4). As will be explained, this open-bottom enclosure configuration provides a convenient structure for in situ animal treatment. The side opening 58 is configured to receive the adjustable door assembly 24 to provide an adjustable-width doorway 66 (see FIGS. 1-7).

With the open-bottom arrangement, the enclosure 22 is preferably devoid of structure directly below the doorway 66 so that the doorway 66 extends continuously from an upper end adjacent the roof 56 to the ground G along treatment location L without interruption. In this manner, the care provider (and, when appropriate, the newborn calf) can pass into and out of the enclosure while remaining supported by the ground G. That is, enclosure ingress and egress is preferably permitted without the care provider having to step or climb onto (or off of) structure of the station 20. However, the illustrated station 20 could have an alternative doorway configuration with respect to some aspects of the present invention.

Figure 2:
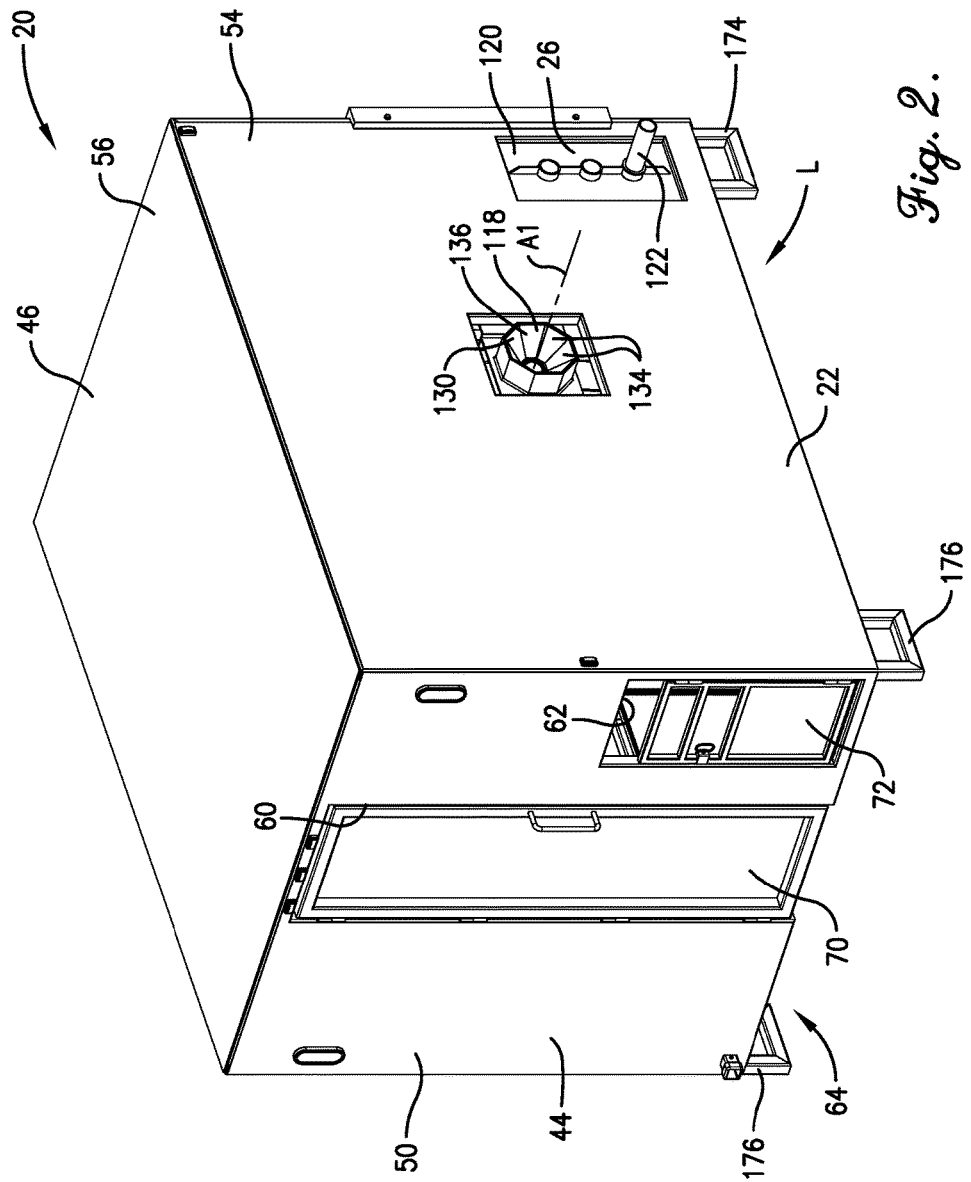
FIG. 2 is a back right perspective of the transportable animal care station shown in FIG. 1.

The enclosure 22 includes a door 70 pivotally mounted in the rear access opening 60 and a gate 72 pivotally mounted in rear compartment opening 62 (see FIG. 2). The door 70 is urged into a closed position by a spring mechanism (not shown) and permits enclosure ingress and egress by the care provider.

Turning to FIGS. 3-6, the enclosure 22 further includes interior walls 76 fixed to the right side wall 54 and rear wall 50, a compartment bottom 78, and an interior compartment door 80 mounted to the rear wall 50. The interior walls 76, door 80, and gate 72 cooperatively define a rear compartment 82 (see FIGS. 3 and 4). The rear compartment 82 is configured to receive a calf (not shown). Furthermore, the compartment 82 can be accessed from inside or outside the enclosure 22. The door 80 is pivotally attached to the rear wall 50 and pivots between open and closed door positions to allow access to the compartment 82 from within the enclosure 22. The gate 72 pivots between open and closed gate positions to permit selective access to the compartment from outside the enclosure 22. The gate 72 also presents openings so that the calf can be viewed from outside the enclosure. This arrangement permits the cow to remain adjacent to and in communication (e.g., through visual or aural communication) with the calf during treatment, observation, transportation (or combinations thereof) of the calf by the care provider while restricting access to the treatment space S by the cow. For instance, if the calf requires further treatment at an offsite facility (e.g., barn or shed), the illustrated construction allows communication between the cow and calf as the station 20 is used to transport the calf (e.g., so that the cow will follow the station 20).

Figure 4:
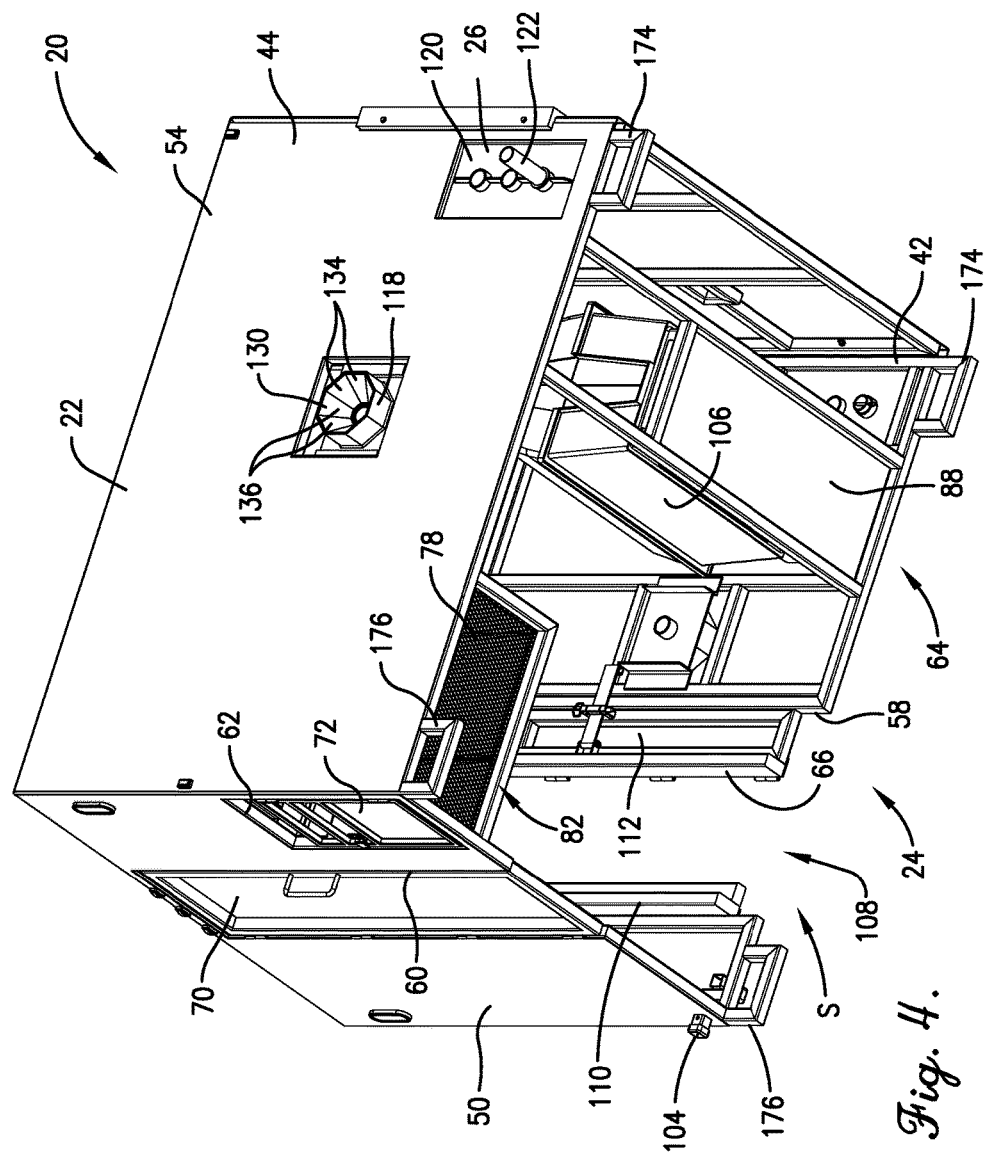
FIG. 4 is a lower right perspective of the transportable animal care station shown in FIGS. 1-3.
Figure 5:
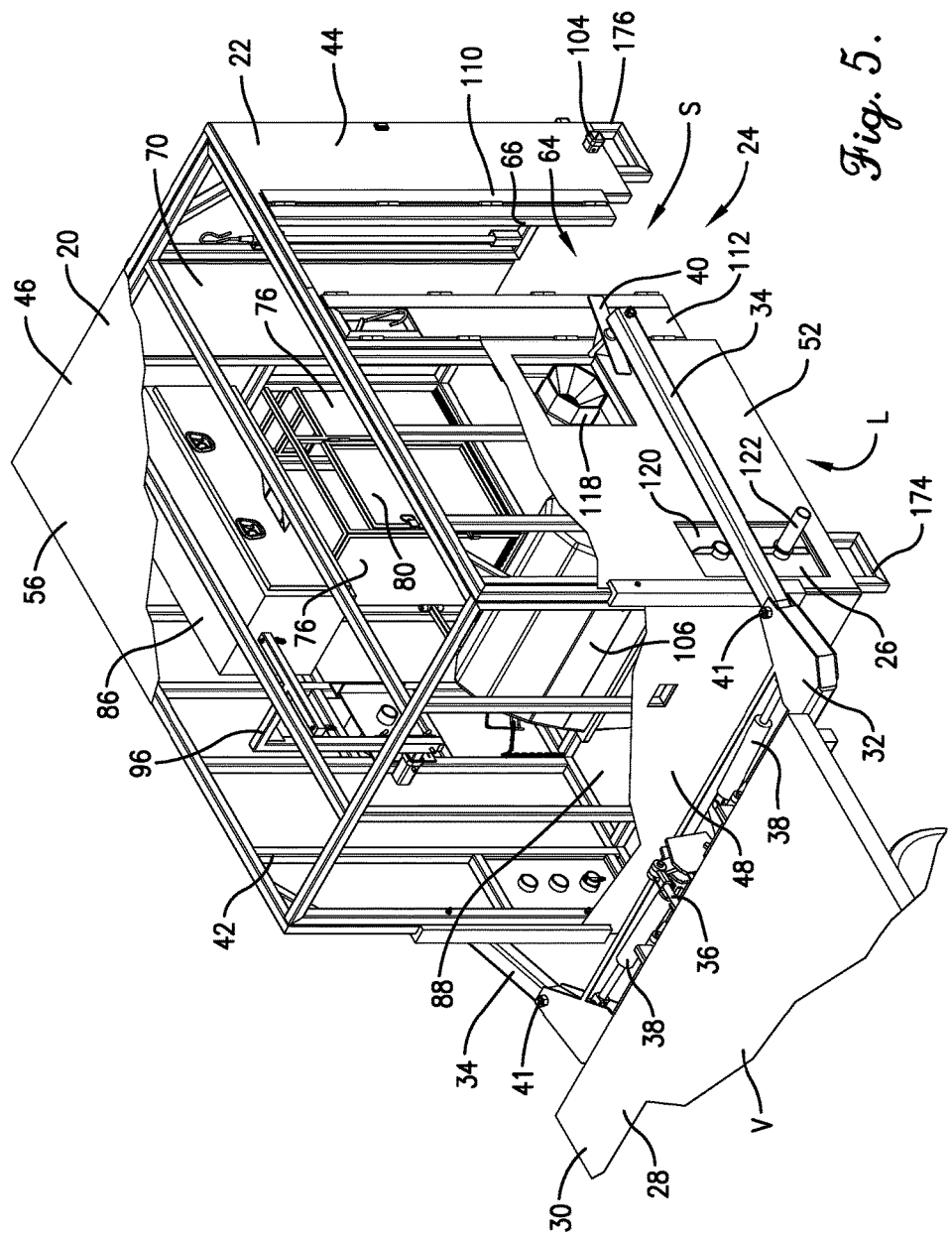
FIG. 5 is a fragmentary left front perspective of the transportable animal care station shown in FIGS. 1-4, and further showing a vehicle with a lift assembly disengaged from the station.

The enclosure 22 also includes a cabinet assembly 86 attached to the right side wall 54 and including a frame and a door mounted to the frame (see FIG. 5). The enclosure 22 further includes a front platform 88 mounted to the front wall 48 within the treatment space S (see FIGS. 3-5). As will be discussed, the platform 88 receives a calf-warming box.

The station 20 preferably includes other equipment to support animal treatment procedures. For instance, the illustrated station 20 includes a sling assembly 96 to hold an animal in a position exterior to the enclosure 22 (see FIG. 14). The sling assembly 96 includes a bracket 98, a beam 100 adjustably supported by the bracket 98, and a sling 102 removably supported by the beam 100. Additional features of the sling assembly 96 are disclosed in U.S. Pat. No. 8,443,759, issued May 21, 2013, entitled MOBILE CALF CARE STATION, which is incorporated in its entirety by reference herein.

The beam 100 is adjustably mounted at one end thereof to the bracket 98 and extends outwardly from the bracket 98. The enclosure 22 preferably includes a plurality of tubular mounts 104 attached to the rear wall 50 and side wall 52. The mounts 104 are each configured to receive the tubular male end of the bracket 98. Thus, the care provider can selectively position the sling assembly 96 in different positions along the rear end 40 of the enclosure 22. It is also within the scope of the present invention where the sling assembly 96 is positioned and supported at other locations along the enclosure 22. Similar to the calf compartment, the sling permits the cow to remain adjacent to and in communication with the calf during treatment, observation, and/or transportation of the calf by the care provider while restricting access to the treatment space S by the cow.

Figure 3:
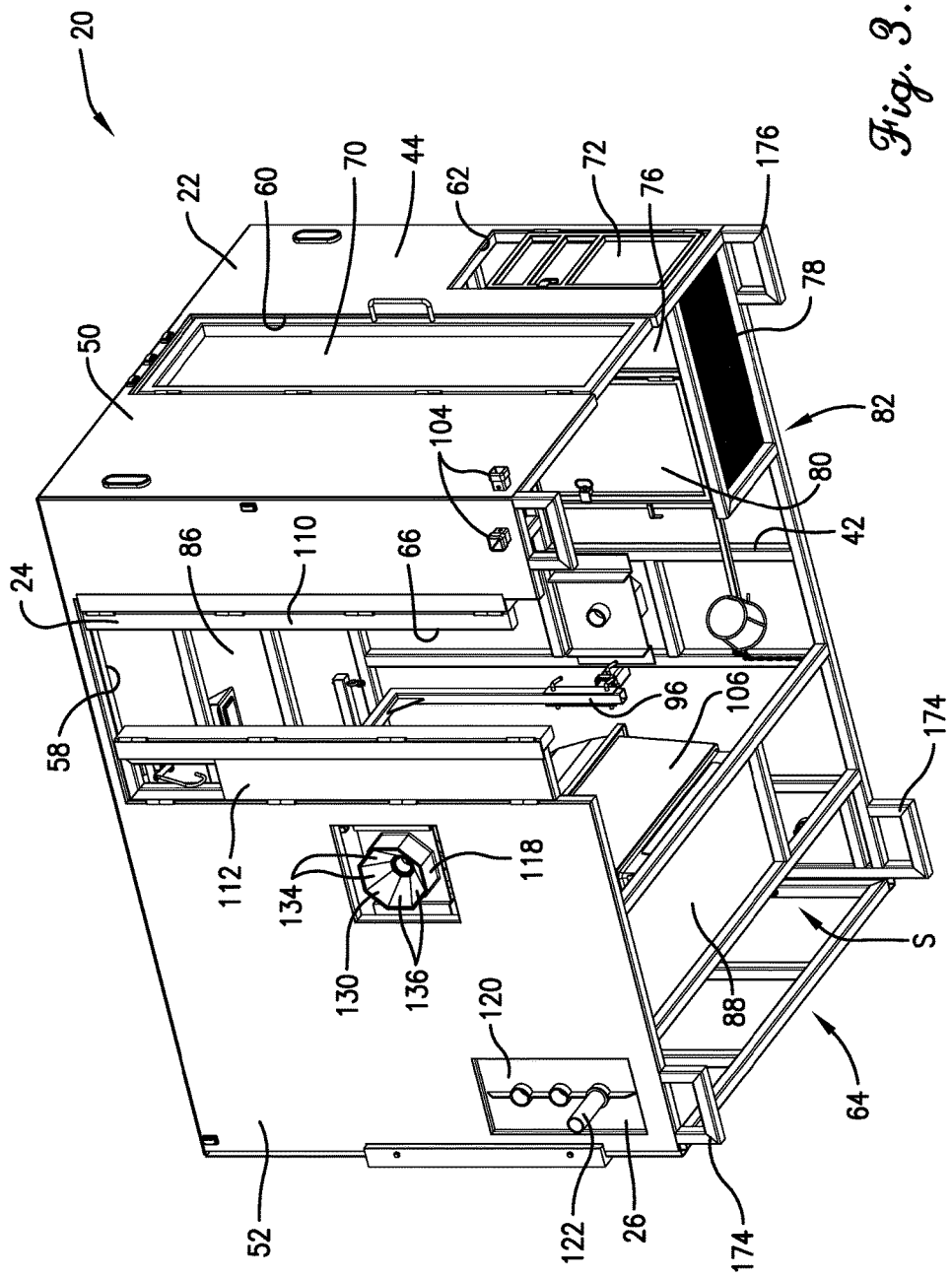
FIG. 3 is a lower left perspective of the transportable animal care station shown in FIGS. 1 and 2.

The illustrated station 20 further includes a calf-warming box 106 mounted on the front platform 94 (see FIGS. 3-5). The calf-warming box 106 is conventional and includes a heating element (not shown) located within the housing to maintain an elevated temperature in the housing. Additional details of the preferred calf-warming box 106 are disclosed in the above-incorporated '759 patent.

While not included as part of the illustrated embodiment, the station 20 can also include a conventional generator (not shown). In the usual manner, the generator can provide electrical power for the warming box 106 and other electrical devices to be used by the care provider.

As mentioned, the side opening 58 is configured to receive the adjustable door assembly 24 to provide the doorway 66. In the illustrated embodiment, the doorway 66 is positioned so that an alley 108 extends laterally at a location spaced between fore and aft ends of the enclosure 22 (see FIGS. 6 and 7).

The illustrated alley 108 extends laterally between the fore and aft ends of the enclosure 22. However, it is also within the ambit of the present invention where the doorway 66 and alley 108 are alternatively positioned. Furthermore, rather than have a single doorway 66, the station 20 could also be configured to include multiple doorways 66 (e.g., where the enclosure 22 presents doorways 66 on opposite sides of the enclosure 22) to further enable access to the treatment space S.

Turning to FIGS. 6-9, the door assembly 24 provides a restriction to enclosure ingress and egress. When a care provider treats a calf in situ, particularly newborn calves, the calf's mother or other members of the herd can act defensively to protect the calf and, in some instances, can be dangerously aggressive toward the care provider. Such actions can present a minor distraction to the care provider or a serious physical threat. The illustrated door assembly 24 is preferably designed to allow ingress and egress by the care provider while restricting animals from entering the enclosure 22, as will be discussed below.

The door assembly 24 preferably includes single and dual panel assemblies 110,112 (see FIGS. 1-7). The illustrated panel assemblies 110,112 preferably present adjustable side margins 114,116 that define a doorway width dimension W (see FIGS. 1 and 7), and the panel assemblies are preferably adjustable to change the doorway width dimension W. However, concerning some aspects of the present invention, the station 20 may have structure alternative to the door assembly 24 to define the doorway width. Preferred features of the single and dual panel assemblies 110,112 are disclosed in the above-incorporated '759 patent.

Turning to FIGS. 3-12, the transport modules 26 permit the station 20 to be selectively moved by the lift mechanism 28 between a rest position (see FIG. 7) and an elevated position (see FIG. 9). Each transport module 26 preferably includes a transport coupler 118, mounting bracket 120, and a bar 122.

Figure 11:
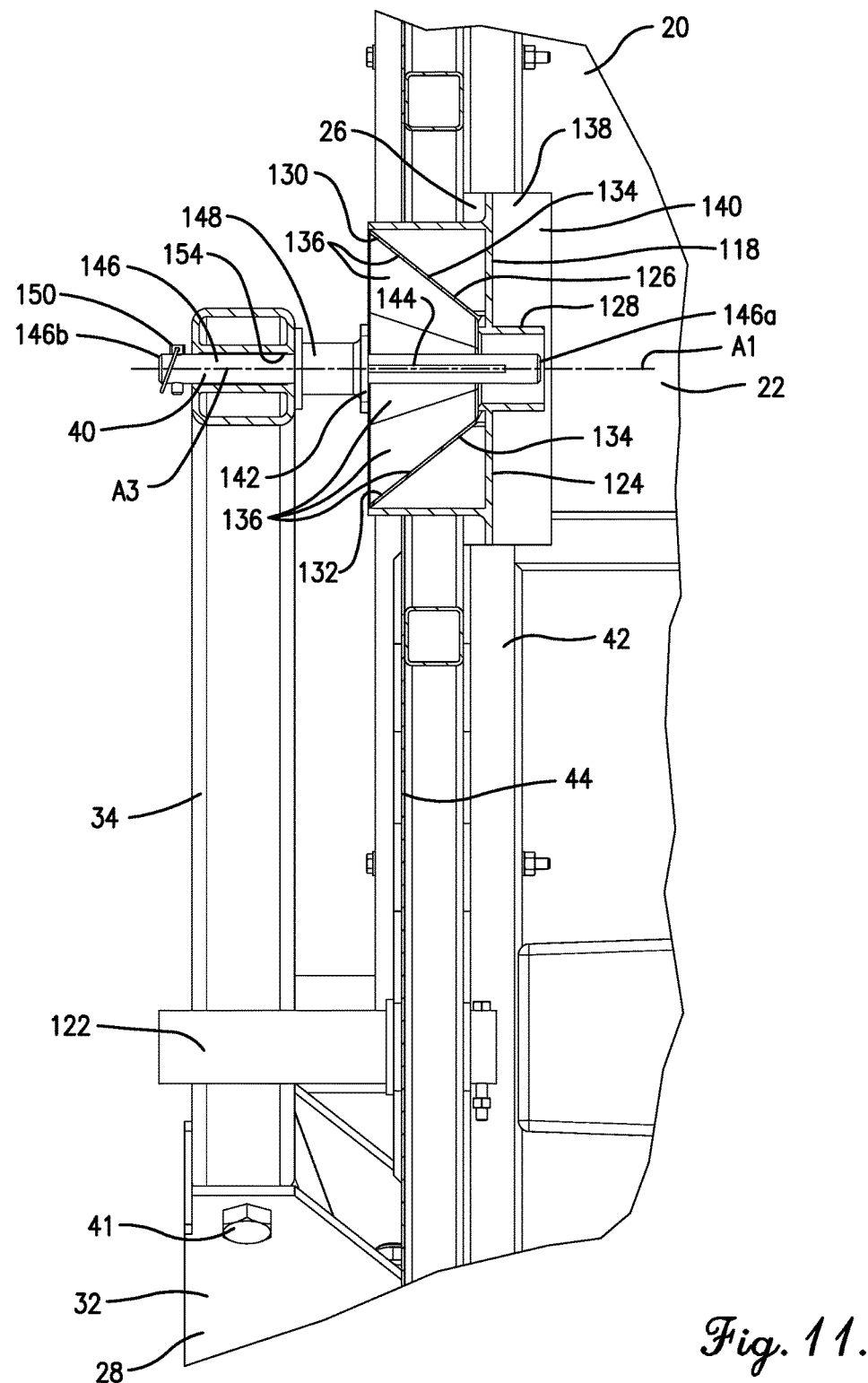
FIG. 11 is a cross section of the transportable animal care station and vehicle taken along line 11-11 in FIG. 9.

Turning to FIGS. 11 and 12, each of the transport couplers 118 is fixed relative to the frame assembly 42 and is operable to be removably connectable to a corresponding one of the prongs 40. Preferably, each transport coupler 118 has a unitary construction and includes a base 124, a funnel 126, and a relief tube 128. The transport coupler 118 forms a coupler socket 130 that surrounds and defines a coupler opening 132. The socket 130 extends along a socket axis A1 between opposite ends of the transport coupler 118.

The illustrated funnel 126 preferably includes a plurality of funnel sections 134 that are positioned about the coupler opening 132, with each funnel section 134 forming a generally planar cam surface 136 (see FIGS. 1-4, 11, and 12). The funnel sections 134 cooperatively provide the funnel-shaped socket 130, with the socket 130 at least partly presenting the cam surfaces 136. While the illustrated planar cam surfaces 136 are preferred, it is within the scope of the present invention where the cam surfaces 136 are alternatively shaped and/or positioned. For instance, the funnel 126 could include a conical cam surface that extends endlessly about the coupler opening 132.

The transport couplers 118 are preferably located along the enclosure 22 so that the socket axes A1 are positioned forwardly of a center of gravity CG of the station 20 (see FIG. 7). However, it is within the scope of the present invention where the socket axes A1 are alternatively positioned. For instance, the socket axes A1 could be located rearwardly of the center of gravity CG. Also, the socket axes A1 could be substantially longitudinally aligned with the center of gravity CG.

The transport coupler 118 preferably provides a female receptacle to receive a male connector (e.g., the prong 40 of the lift mechanism 28). However, it is within the scope of the present invention where the transport coupler 118 comprises a male connector and the lift mechanism 28 includes a female receptacle to receive the transport coupler 118. The cam surfaces 136 preferably taper toward one another in an inboard direction to guide a respective prong 40 into connecting engagement with the transport coupler 118.

The illustrated enclosure 22 includes a pair of angular brackets 138 that cooperatively form a window 140 (see FIGS. 9, 11, and 12). Each window 140 receives and supports a corresponding one of the transport couplers 118, with each transport coupler 118 being fixed to respective brackets 138. Preferably, the transport coupler 118 is mounted so that the socket axis A1 extends laterally. More preferably, the transport coupler 118 is mounted so that the socket axis A1 is substantially orthogonal to a longitudinal axis A2 of the station 10 (see FIG. 1). However, it is within the scope of the present invention where the transport coupler 118 is alternatively positioned and/or attached relative to the enclosure 22.

Turning to FIGS. 11 and 12, the vehicle V includes prongs 40. Each prong 40 preferably includes a flange 142, a pair of gussets 144, a shaft 146, and a sleeve 148 integrally attached to one another to form a unitary structure. The shaft 146 is elongated and presents inboard and outboard ends 146a,b and a prong axis A3 extending between the ends 146a,b. The shaft 146 also presents a transverse opening operable to removably receive a pin 150.

The illustrated flange 142 comprises a flat rectangular plate that presents an opening (not shown) to receive the shaft 146. The flange 142 extends transversely to the length of the shaft 146 and is spaced between the ends 146a,b. The gussets 144 are attached to opposite sides of the shaft 146 and extend away from each other in opposite directions. The gussets 144 are also attached to the flange 142 to rigidly interconnect the flange 142 and shaft 146 to one another. The sleeve 148 is attached to the flange 142 and shaft 146 and projects in an outboard direction from the flange 142.

When secured to the lift arm 34, the shaft 146 of the prong 40 is rotatably received in a corresponding arm opening 154 (see FIGS. 11 and 12), with the inboard end 146a being spaced inboard of the lift arm 34. Thus, the prong 40 can spin freely relative to the lift arm 34 about the prong axis A3.

Turning to FIGS. 5 and 6, the lift arms 34 and prongs 40 can be shifted laterally to control the lateral position of the prongs 40. For instance, the hydraulic cylinders 38 can each drive a respective lift arm 34 so that the lift arm 34 and prong 40 pivot along an outboard direction or an inboard direction. Again, the lift arm 34 and prong 40 are shiftable through a range of positions between the fully inboard position (not shown) and the fully outboard position. As is customary, the lift arms 34 can move simultaneously toward one another (i.e., in the inboard direction) or simultaneously away from one another (i.e., in the outboard direction).

Again, the lift arms 34 are pivotal about the pivot axis R between inboard and outboard positions (not shown). In one intermediate arm position between the inboard and outboard positions, the lift arms 34 are positioned so that the prongs 40 engage the transport couplers 118 in an engaged position (see FIGS. 6, 11, and 12). In another intermediate arm position, the lift arms 34 are shifted outboard so that the prongs 40 are adjacent but disengaged from the transport couplers 118 in a disengaged position (see FIG. 5).

While the illustrated prong 40 provides a preferred male connection mechanism to engage the station 20, it is within the ambit of the present invention where the prong 40 has an alternative construction. For instance, the prong 40 could have an alternative male structure to be received by the transport coupler 118. Furthermore, the prong 40 could have a female structure that presents an opening to receive the coupler 118 (i.e., where the coupler 118 has a male structure).

Turning to FIGS. 5, 6, 11, and 12, the illustrated prong 40 is preferably removably attachable to a corresponding one of the transport couplers 118. In the illustrated embodiment, the prong 40 is laterally shiftable into and out of the engaged position (see FIGS. 6, 11, and 12) where the gussets 144 of the prong 40 engage the socket 130. To engage the prong 40 with the socket 130 of the transport coupler 118, the prong 40 is first preferably aligned with the socket 130 so that the socket axis A1 and the prong axis A3 are substantially coaxially aligned with one another (see FIGS. 11 and 12). Such alignment can be achieved, for instance, by moving the vehicle V longitudinally relative to the lift mechanism 28 and/or by pivoting the lift base 32 relative to the bed 30. Each hydraulic cylinder 38 is then preferably operated to shift the lift arm 34 and prong 40 in the inboard direction until the prong 40 is received by and engages the socket 130.

However, it is within the ambit of the present invention where the prong 40 is alternatively brought into engagement with the socket 130 of the transport coupler 118. For instance, prior to being received by the socket 130, the prong 40 could be positioned adjacent but off-axis relative to the socket 130 so that the inboard end 146a of the shaft 146 is positioned within the longitudinal and vertical extent of the socket 130. That is, the prong 40 could be positioned off-axis relative to the socket 130 but longitudinally and vertically within the outermost margin of the socket 130. In such an off-axis position, the inboard end 146a of the prong 40 can be brought into engagement with at least one of the cam surfaces 136 as the lift arm 34 and prong 40 are moved inboard. Further inboard movement of the lift arm 34 and prong 40 preferably causes at least one of the cam surfaces 136 to automatically shift the prong 40 longitudinally and/or vertically into engagement with the socket 130, and preferably shifts the prong 40 into coaxial alignment with the socket 130. However, for some aspects of the present invention, the prong 40 and the socket 130 could be engaged with one another without being coaxially aligned.

To disengage the prong 40 from the transport coupler 118, the hydraulic cylinder 38 is operated to shift the lift arm 34 and prong 40 in the outboard direction. Once located in the disengaged position (see FIG. 5), the prong 40 and the transport coupler 118 permit the prong 40 and lift arm 34 be shifted longitudinally and/or vertically relative to the transport coupler 118.

Of course, it will be appreciated that the lift arms 34 and prongs 40 can be moved simultaneously toward one another (i.e., in the inboard direction) to simultaneously engage the respective transport couplers 118. Also, the lift arms 34 and prongs 40 can be moved simultaneously away from one another (i.e., in the outboard direction) to be simultaneously disengaged from the transport couplers 118. However, while such simultaneous engagement and disengagement is possible, the lift arms 34 and prongs 40 can be shifted into and out of engagement with the transport couplers 118 at different times relative to one another.

Turning to FIGS. 9-13, each mounting bracket 120 serves to support a respective bar 122 and thereby restrict movement of the station 20 relative to the lift mechanism 28. Each mounting bracket 120 preferably is unitary and includes an outer frame 156, a plate body 158, tubular sections 160, and reinforcing ribs 162. The plate body 158 is elongated and presents spaced apart plate openings 164 (see FIG. 10) to receive the tubular sections 160.

The plate body 158 preferably spans and is fixed to the outer frame 156. The tubular sections 160 are preferably received in corresponding plate openings 164 and fixed to the plate body 158. The illustrated tubular sections 160 preferably present mounting sockets 166 that provide attachment locations 168 (see FIG. 10). The ribs 162 are fixed to the plate body 158 and to corresponding tubular sections 160 to rigidify the mounting bracket 120.

The illustrated mounting bracket 120 is positioned in a window of the enclosure 22, with the tubular sections 160 being spaced vertically relative to one another. The mounting bracket 120 is preferably fixed to the frame assembly 42 of the enclosure 22. However, it is within the ambit of the present invention where the bracket 120 is alternatively positioned and/or attached relative to the enclosure 22. Yet further, as will be shown in a subsequent embodiment, the mounting bracket 120 could be alternative constructed to support the bar 122.

Preferably, the mounting brackets 120 are oriented and located in a mirrored arrangement relative to one another on opposite sides of the longitudinal axis A2 of the enclosure 22. In other words, the illustrated mounting brackets 120 are both preferably arranged vertically, are located at substantially the same height as one another, and are located at substantially the same longitudinal position along the longitudinal axis A2 of the enclosure 22. Additionally, the mounting brackets 120 preferably face in opposite directions relative to one another. As will be discussed, this arrangement permits a pair of bars 122 to be positioned substantially coaxially with one another.

Figure 10:
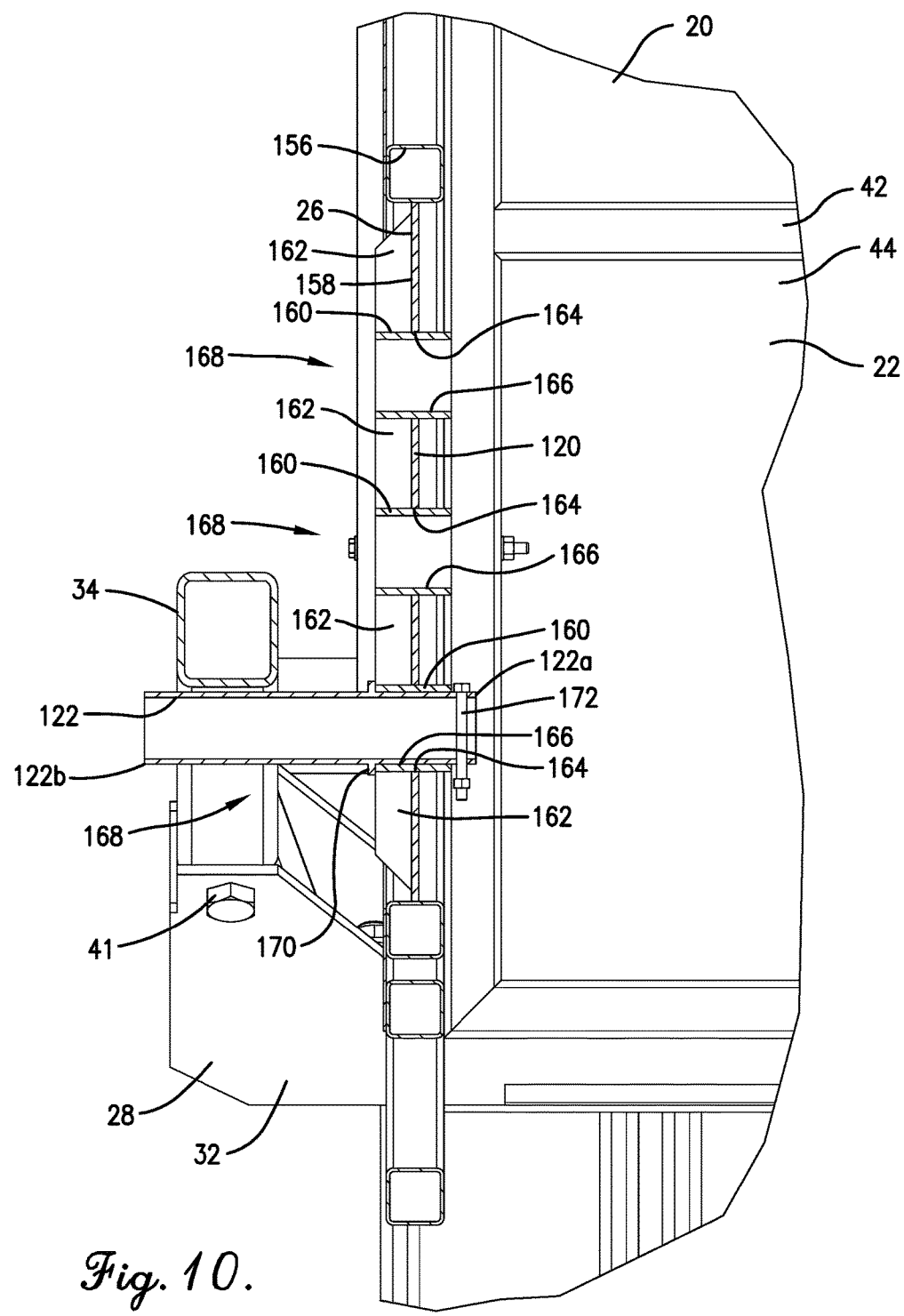
FIG. 10 is a cross section of the transportable animal care station and vehicle taken along line 10-10 in FIG. 9.

Turning to FIGS. 10 and 13, each bar 122 is configured to be attached to a respective mounting bracket 120 and operate as a stop. Specifically, each bar 122 can engage the lift mechanism 28 (normally when the lift mechanism 28 is connected with the transport coupler 118) to restrict rotation of the enclosure 22 about a transverse axis. Preferably, the bar 122 comprises a unitary tube that is elongated and presents inboard and outboard tube ends 122a,b. The bar 122 further includes a ring 170 that is spaced between the ends 122a,b and projects radially outwardly from the outer surface of the tube.

Each bar 122 is selectively removably attachable to the mounting bracket 120 at any one of the attachment locations 168. In particular, the bar 122 can be selectively inserted into one of the sockets 166 presented by the tubular sections 160. With the bar 122 inserted so that the ring 170 engages the tubular section 160, a pin 172 can be mounted adjacent the inboard end 122a of the bar 122 to secure the bar 122 to the mounting bracket 120 and restrict removal therefrom (see FIGS. 10 and 13).

Similarly, each bar 122 can be selectively detached from the mounting bracket 120 (e.g., to reposition the bar 122 at another one of the attachment locations 168). Specifically, the bar 122 is removed by initially removing the pin 172 from the bar 122. The bar 122 can then be moved outboard away from the enclosure 22 so as to be shifted out of engagement with the tubular section 160.

When the bar 122 is secured to the mounting bracket 120 at one of the attachment locations 168, the bar 122 is operable to be brought into and out of engagement with a corresponding one of the lift arms 34. As will be discussed, such engagement serves to restrict movement of the enclosure 22, particularly when the prongs are engaged with the transport couplers 118.

Preferably, the illustrated bars 122 can be secured to the mounting brackets 120 so as to be positioned substantially coaxially with one another. For instance, the bars 122 can be secured to lowermost ones of the sockets 166 (see FIGS. 1 and 2). When the bars 122 are secured in coaxial alignment with one another, each bar 122 can be brought into and out of engagement with a corresponding one of the lift arms 34. In this manner, the bars 122 cooperatively engage the lift arms 34 to restrict movement of the enclosure 22. Engagement between the bars 122 and the lift arms 34 serves to restrict movement of the enclosure 22, particularly when the prongs 40 attached to the lift arms 34 are engaged with the transport couplers 118.

Turning to FIGS. 7-9, the station 20 is operable to be selectively lifted above the ground G by the lift mechanism 28. Initially, when the station 20 is supported on the ground G in a rest position (see FIG. 7), the station 20 is supported by forward feet 174 and aft feet 176 of the frame assembly 42. The lift mechanism 28 is operated to bring both prongs 40 into connecting engagement with the respective transport couplers 118. As discussed above, this is done by shifting each prong 40 inboard until the prong 40 is received by and engages the socket 130.

Figure 1:
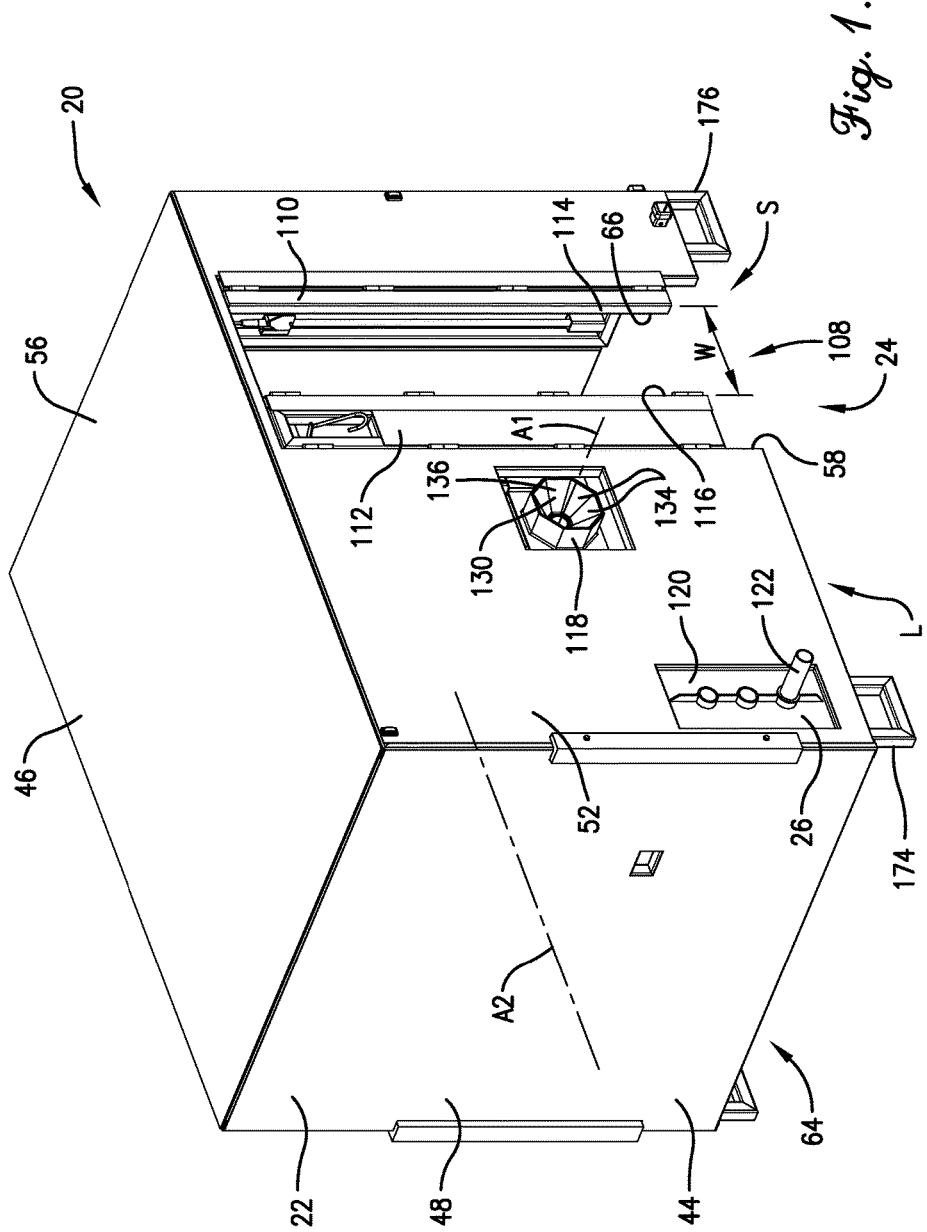
FIG. 1 is a left front perspective of a transportable animal care station constructed in accordance with a first preferred embodiment of the present invention, with the station including an enclosure, an adjustable door assembly, and opposite transport modules.

Both of the bars 122 are preferably secured at an aligned pair of attachment locations, such as the lowermost pair attachment locations (see FIGS. 1 and 2). The bars 122 are preferably secured prior to lifting the station 20, although securement of one or both of the bars 122 could be done at some point after lifting of the station 20 has begun.

With the prongs 40 and transport couplers 118 in engagement, the hydraulic cylinder 36 of the lift mechanism 28 can be moved to pivot the lift base 32, lift arms 34, and prongs 40 in a generally upward direction to an intermediate position (see FIG. 8). Because the socket axes A1 are located forwardly of the center of gravity CG, lifting of the prongs 40 causes the station 20 to swing about the prong axes A3. In particular, the station 20 swings so that the forward feet 174 of the station 20 are lifted above the ground G while the aft feet 176 remain in contact with the ground G. The aft feet 176 remain on the ground G up to the point where the lift arms 34 come into engagement with the bars 122 in the intermediate position.

As the lift mechanism 28 pivots the lift base 32, lift arms 34, and prongs 40 to lift the prongs 40 beyond the intermediate position, the bars 122 engage the lift arms 34 to restrict swinging movement of the station 20 relative to the lift mechanism 28. Thus, as the lift mechanism 28 lifts the station 20 beyond the intermediate position, the aft feet 176 are lifted above the ground G. In other words, lifting of the station 20 beyond the intermediate position causes the station 20 to be pivoted with the lift base 32 and lift arms 34. The lift mechanism 28 can be operated to lift the station 20 into an elevated position where the forward and aft feet 174,176 are spaced the substantially the same distance above the ground G (see FIG. 9). In this manner, the station 20 is generally parallel to the ground G. In the elevated position, the station 20 can be selectively transported to and from the treatment location L. Additionally, the operator can occupy and use the station 20 in the elevated position.

In operation, the lift mechanism 28 of the vehicle V can be operated to selectively grasp and lift the station 20. With the prongs 40 being located adjacent to the transport couplers 118, the lift arms 34 can be shifted in the inboard direction so that the prongs 40 engage the transport couplers 118. Once engaged with the station 20, the lift mechanism 28 can be operated to lift the station 20 above the ground G. The station 20 is preferably lifted so that the bars 122 engage the lift arms 34 and the feet 174,176 are both spaced above the ground G. The station 20 is also preferably lifted into the elevated position where the station 20 is oriented to be generally parallel to the ground G (see FIG. 9).

In the elevated position, the user can occupy the station 20 (e.g., for treating an animal). The user can also transport the station 20 in the elevated position from one location to another location. When desired, the user can also operate the lift mechanism 28 to selectively lower the station 20 into the rest position (see FIG. 7). In the rest position, the user can further operate the lift mechanism 28 to selectively disengage the prongs 40 of the lift mechanism 28 from engagement with the transport couplers 118.

Turning to FIGS. 15 and 16, an alternative station 200 is constructed in accordance with a second preferred embodiment of the present invention. For the sake of brevity, the remaining description will focus primarily on the differences of this embodiment from the preferred embodiment described above.

The station 200 includes, among other things, an enclosure 202 and alternative transport modules 204. Each transport module 204 preferably includes a transport coupler 206, an alternative mounting bracket 208, and an adjustable stop structure 210. The mounting bracket 208 preferably includes a frame 212, a plate body 214, a tubular section 216, and a rib 218.

The stop structure 210 preferably includes an elongated leg 220, a tubular projection 222, and an adjustable bar 224. The leg 220 presents upper and lower ends and a pairs of holes 226 between the ends. The tubular projection 222 is fixed to the leg 220 adjacent the upper end thereof. The tubular projection 222 projects laterally from the leg 220 to be received by a socket 228 formed by the tubular section 216.

The adjustable bar 224 is unitary and preferably includes a tube 230, an attachment tab 232, and a gusset 234. The tab 232 presents holes 236 that can be selectively aligned with any one of the pairs of holes 226. Thus, the bar 224 can be selectively positioned and secured to the leg 220 by inserting pins 238 through holes 226,236.

Similar to the previous embodiment, the stop structure 210 can be selectively secured to the mounting bracket 208 by slidably inserting the tubular projection 222 into the socket 228. The projection 222 is then secured to the mounting bracket 208 with a pin (not shown). When secured, the stop structure 210 can pivot relative to the mounting bracket 208 about the axis of the socket 228.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A transportable animal care station operable to be lifted and transported by a vehicle having a pair of opposite lifting components, said transportable animal care station comprising:

an enclosure defining a treatment space configured to receive user and animal occupants, said enclosure including a roof structure that at least partially covers the treatment space, side walls that extend longitudinally on opposite sides of the treatment space, and a doorway that permits ingress and egress relative to the treatment space, said enclosure presenting an open bottom so that user and animal occupants within the treatment space may be supported directly on the ground at a treatment location;

a pair of opposite transport couplers fixed relative to the side walls, with each of the couplers being removably connectable to a corresponding one of the lifting components, said transport couplers each presenting an opening that extends transversely to receive and connect to a respective lifting component, said transport couplers each including an inwardly tapering socket in a surrounding relationship with the opening to guide the respective lifting component into connecting engagement with the transport coupler, and a stop spaced from a corresponding transport coupler in a longitudinal direction, said stop being configured to engage the respective lifting component connected to the corresponding transport coupler and thereby restrict rotation of the enclosure about a transverse axis.

2. The transportable animal care station as claimed in claim 1, said transport coupler being longitudinally rearward of the stop.

3. The transportable animal care station as claimed in claim 2, said animal care station defining a station center of gravity, said stop being longitudinally forward of the station center of gravity.

4. The transportable animal care station as claimed in claim 3, said transport coupler being longitudinally forward of the station center of gravity.

5. The transportable animal care station as claimed in claim 1; an additional stop opposite from the first-mentioned stop, with each of said stops being each spaced from a corresponding transport coupler in the longitudinal direction, each of said stops being configured to engage a corresponding lifting component when the lifting component is connected with the transport coupler to restrict rotation of the enclosure about the transverse axis.

6. The transportable animal care station as claimed in claim 5, each of said pair of opposite stops being supported relative to the side walls, said stop devices being spaced longitudinally from the transport couplers along the longitudinal direction.

7. The transportable animal care station as claimed in claim 5, each of said stops being shiftably supported relative to the enclosure to be located in a plurality of positions spaced relative to one another.

8. The transportable animal care station as claimed in claim 7; and
a pair of opposite mounting brackets fixed to the enclosure and each presenting a plurality of attachment locations spaced vertically from one another, with each stop being removably attachable to a respective one of the mounting brackets at any one of the attachment locations.

9. The transportable animal care station as claimed in claim 1,
said stop being shiftably supported relative to the enclosure to be located in a plurality of positions spaced relative to one another.

10. A transportable animal care station operable to be lifted and transported by a vehicle having a pair of opposite lifting components, said transportable animal care station comprising:
an enclosure including a frame and defining a treatment space,
said enclosure presenting opposite fore-and-aft extending side walls
said enclosure presenting an opening that permits ingress and egress relative to the treatment space,
said opening being defined in one of the side walls;
a pair of opposite transport couplers fixed relative to the frame, with each of the couplers being removably connectable to a corresponding one of the lifting components; and
a stop spaced from a corresponding transport coupler in a first direction,
said stop being configured to engage a corresponding lifting component when the lifting component is connected with the transport coupler to restrict rotation of the enclosure about an axis transverse to the first direction,
said stop being shiftably supported relative to the frame to be located in a plurality of positions spaced relative to one another.

11. The transportable animal care station as claimed in claim 10,
said transport couplers each presenting an opening that extends transversely to receive and connect to a respective lifting component.

12. The transportable animal care station as claimed in claim 11,
said openings being at least partly formed by opposed cam surfaces that taper toward one another in an inboard direction to guide the lifting components into connecting engagement with the transport couplers.

13. The transportable animal care station as claimed in claim 12,
said transport couplers each including a funnel-shaped socket that surrounds the opening,
said socket at least partly forming the cam surfaces of the opening.

14. The transportable animal care station as claimed in claim 10; and
a mounting bracket fixed to the frame and presenting a plurality of attachment locations spaced vertically from one another, with the stop being removably attachable to the mounting bracket at any one of the attachment locations.

15. The transportable animal care station as claimed in claim 14,
each of said attachment locations being provided by a hole,
said stop including a bar that presents an end slidably mountable in the holes.

16. The transportable animal care station as claimed in claim 10,
said transport coupler being longitudinally rearward of the stop.

17. The transportable animal care station as claimed in claim 16,
said animal care station defining a station center of gravity,
said stop being longitudinally forward of the station center of gravity.

18. The transportable animal care station as claimed in claim 17,
said transport coupler being longitudinally forward of the station center of gravity.

* * * * *